April 3, 1962     H. L. DOBRIKIN     3,027,905

DASH CONTROL VALVE

Filed Nov. 15, 1957

INVENTOR.
HAROLD L. DOBRIKIN,
BY Parker and Carter
ATTORNEYS.

United States Patent Office 3,027,905
Patented Apr. 3, 1962

3,027,905
DASH CONTROL VALVE
Harold L. Dobrikin, Chicago, Ill., assignor, by mesne assignments, to Berg Airlectro Products Co., Chicago, Ill., a corporation of Illinois
Filed Nov. 15, 1957, Ser. No. 696,704
8 Claims. (Cl. 137—102)

This invention relates to a control valve for use in air pressure systems of the type employed with vehicle air brakes, for example.

One purpose is to provide a control valve effective in normal position to automatically insure the delivery of air pressure to a desired point.

Another purpose is to provide a control valve operable automatically to protect the air brake pressure system of truck trailers and the like.

Another purpose is to provide a valve of the type described which may be effective automatically in normal position to insure a supply of air pressure to a desired point and which may be operable in emergency position to release air pressure from said point.

In trailer air brake systems, and the like, it is important to insure a supply of air under pressure to various portions of said system. For example, most systems employ a tractor-protector valve to which air is supplied under pressure. The vehicle operator normally has a control valve available to him and normally mounted on the dash of the vehicle cab, such as that of a tractor. Prior control valves have been designed for manual operation by the vehicle operator. Such valves are, however, subject to human error, and failure to operate or set such valves could normally result in failure of the air supply to the tractor-protector valve. It is, accordingly, one purpose of my invention to provide a dash control valve which will insure the automatic supply of said pressure and which shall be subject to a minimum of human error.

Another purpose is to provide a dash control valve effective in one position to supply air under pressure to a tractor-protector valve and the like, and, in another position, to vent the tractor-protector valve or similar device to the atmosphere.

Other purposes will appear from time to time during the course of the specification and claims.

I illustrate my invention more or less diagrammatically in the accompanying drawings, wherein—

Figure 1:
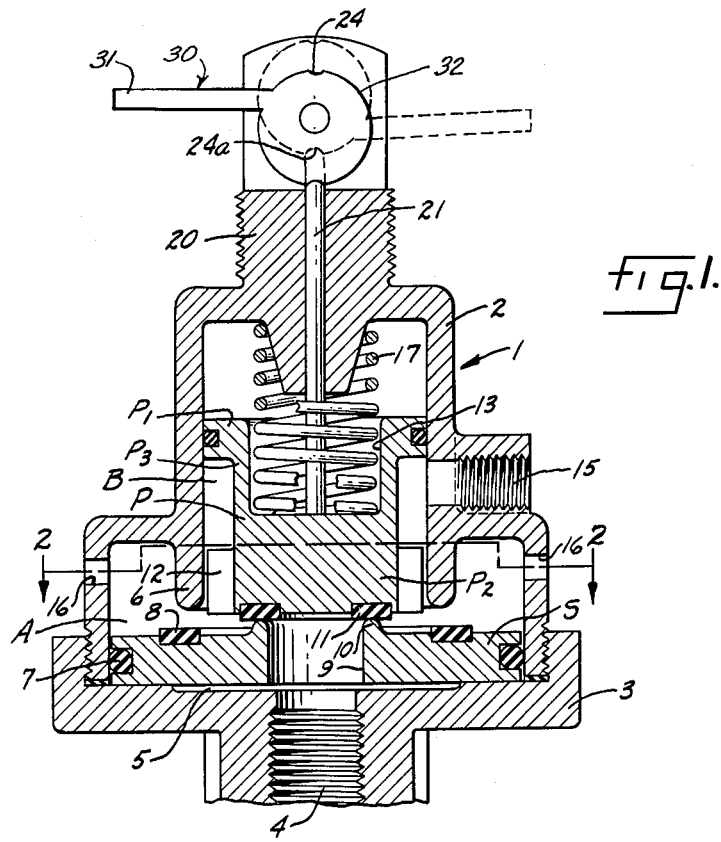
Figure 2:
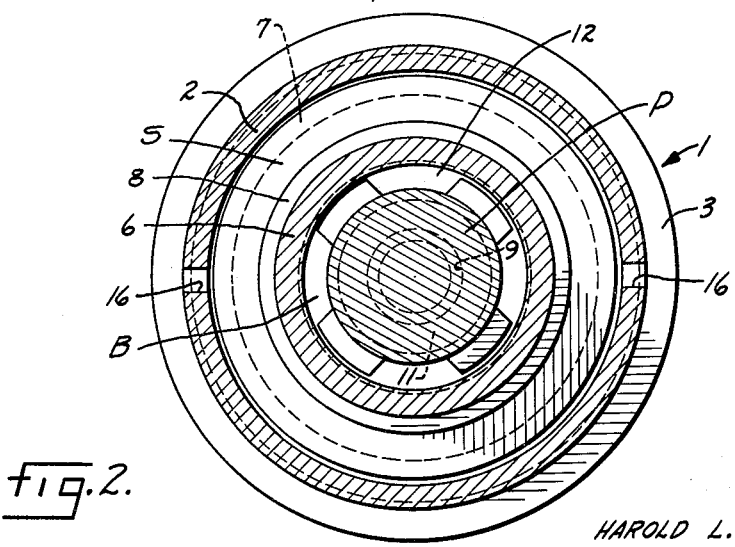

FIGURE 1 is a side elevation in cross-section;
FIGURE 2 is a view taken on the line 2—2 of FIGURE 1.

Like parts are indicated by like numerals throughout the drawings and specifications.

Referring now to the drawings, the numeral 1 generally indicates a valve housing. The housing 1 may be formed of a first part 2 and a second part 3 threadably engaged therewith. The part 3 may have an air pressure inlet passage 4 extending through a wall of the part 3 and into a first chamber A in the housing 1. A well 5 is formed in the wall of the housing part 3 about the passage 4, for the purpose described hereinbelow. The chamber A has a wall portion thereof forming a valve seat or seal seat 6. Reciprocally mounted within the chamber A, and positioned to be acted upon by air entering under pressure from inlet 4, is a shuttle or first piston S. The piston S may have a piston ring or piston seal 7 mounted thereon for engagement with the peripheral walls of the chamber A. A valve seal 8 is carried by one face of the shuttle piston S and positioned to engage the valve seat 6. An air passage 9 is formed centrally in the shuttle S, in general alignment with the passage 4, and the shuttle S has a valve or piston seat portion 10 surrounding the passage 9 at the outlet end thereof and formed on the face of the shuttle S opposite the shuttle face opposing the well 5.

Positioned for reciprocation within a chamber B of the housing 1 is a second piston P, having upper and lower piston head segments $P_1$ and $P_2$ joined by a reduced central section $P_3$. A valve seal or ring 11 is carried by the lower face of segment $P_2$ for engagement with the valve seat portion 10 on the shuttle S. A plurality of axially paralleling air passages 12 is formed in the piston part $P_2$ radially outside the valve seal 11. Parts $P_1$ and $P_3$ have an upwardly open well 13 formed therein for the hereinbelow described purpose.

The housing portion 2 has an outlet air passage 15 extending through the wall thereof and communicating with the chamber B adjacent the reduced portion of piston P and between spaced piston heads $P_1$ and $P_2$ at all positions of piston P. The chamber A has one or more vent passages 16 formed in and extending through the wall thereof beyond the seat 6 from shuttle piston 8.

A spring 17 is positioned within the chamber B and has its opposite ends engaged within the well 13 of the piston P and with the opposed inner wall surface of the housing portion 2.

Slidably mounted within a wall portion 20 of the housing portion 2 is a floating emergency control rod 21. The rod 21 has its inner end positioned to engage the bottom wall of the well 13 in piston P. The outer end of rod 21 may conveniently be spherical in form and is positioned for engagement with well or detent, as indicated generally at 24 on a cam-operated control lever 30 which is rotatably mounted upon or adjacent the outer surface of the housing 1. The control lever 30 has an operating handle portion 31 and a rod-actuating cam portion 32, on which the detent indicated at 24 is formed. As illustrated, the control lever 30 is shown in normal position in dotted lines, and in full lines, it is illustrated in the emergency position. In the emergency position, a second detent 24a engages the spherical end of the rod 21 to urge and hold the piston P toward and in its innermost position.

Whereas I have described and claimed a practical and operative device, nevertheless, many changes may be made in the size, shape, number and disposition of parts without departing from the spirit of my invention. I therefore wish my description and drawings to be taken as, in a broad sense, illustrative or diagrammatic, rather than as limiting me to my precise showing.

The use and operation of my device is as follows:

As air pressure builds up in the tractor system and passes through the passage 4, it is initially exerted against that surface of the shuttle or piston S opposed to or adjacent the well 5 formed in the wall of the housing part 3. The air under pressure also passes through the passage 9 and is exerted simultaneously against the piston head $P_2$. Thus, the shuttle S and piston P are moved as a unit inwardly, or upwardly as the parts are shown in the drawings, until the seal 8 is brought into contact with its seat 6, stopping shuttle S.

As the pressure continues to build up through the passages 4 and 9, the piston P is then moved inwardly, or upwardly as the parts are shown in the drawings, to unseat the valve or seal 11 from the valve seat 10. Thence the air passes through the air passages 12 in the piston head $P_2$ into the annulus about piston part $P_3$ in chamber B, and from the chamber B, the air under pressure passes through the outlet 15, and from there it is directed to a suitable point, such as a tractor protector valve, (not shown).

The foregoing operation of the dash control valve of my invention is automatic and, so long as there is air pressure in the tractor system, the proper amount, controlled by the setting of the spring 17, of air pressure is delivered through the passage 15 to the tractor protector valve. If the air pressure from the tractor system drops below a predetermined safety point, the spring 17 is effective to return the piston P and shuttle piston S to the positions illustrated, for example, in FIGURE 1. This action produces a vent passage for the air pressure in the system, the said vent passage comprising the passage 15, annular chamber B, passage 12, chamber A and passage 16. The air, venting to atmosphere, moves through the passage 15, thence through annular chamber B and the passage 12, under the seat 6 and out through the vent passage 16 in the wall of chamber A.

Should the operator wish to vent the air pressure in the system to atmosphere, it is necessary only that the operator move the control handle 30 from its normal position to the emergency position illustrated in full lines in FIGURE 1. In so doing, the cam 32 is effective to move the rod 21 inwardly into contact with and to move the piston P and with it shuttle S toward the position illustrated in FIGURE 1. As soon as the piston P and shuttle S move far enough to unseat the valve or seal 8 from the seat 6, the vent passage is open to atmosphere.

I claim:

1. In a control valve, a housing, a first chamber in said housing, a second chamber in said housing in communication with said first chamber, a shuttle member in said first chamber, a piston in said second chamber, a fluid pressure inlet in said first chamber positioned to deliver fluid under pressure to said shuttle member, a fluid pressure passage in said shuttle member positioned to deliver said fluid under pressure to said piston, said shuttle and piston having valve-and-seat portions effective to open and close said last-named passage, a seat in said first chamber for said shuttle member, a fluid passage in said piston communicating with said first chamber and said second chamber, said piston being movable away from said shuttle member in response to increased pressure through said shuttle member passage, a fluid pressure outlet from said second chamber positioned to receive fluid under pressure from said chamber-communicating passages in said piston, and a fluid pressure outlet in said first chamber and in communication with said second chamber outlet when said shuttle is positioned away from said first chamber shuttle seat.

2. A control valve comprising a housing, a first chamber in said housing, a second chamber in said housing, and air pressure inlet communicating with said first chamber, a shuttle member in said first chamber, a seat in said first chamber for said shuttle member, a piston in said second chamber, an air passage in said shuttle member, said piston being movable into contact with said shuttle member to close said air shuttle-member passage, yielding means in said second chamber positioned to urge said piston into contact with said shuttle member to close said last-named passage, an air passage in said piston communicating with said first chamber and said second chamber, an air outlet in said second chamber positioned in and communicating with said second chamber, and an air pressure outlet in said first chamber in communication with said second chamber outlet when said shuttle is positioned away from said first chamber shuttle seat.

3. The structure of claim 2 characterized by and including a rod reciprocably mounted in a wall of said second chamber and means for moving it against said piston to urge said piston toward said shuttle member.

4. The structure of claim 2 characterized by and including a rod slidably mounted in a wall of said housing and a manually operable element rotatably mounted on said housing and positioned to urge said rod in a direction toward said piston, in response to rotation of said manually operable element.

5. The structure of claim 2, wherein said piston includes a dual headed member including spaced head portions joined by a reduced diameter shank portion, said reduced portion forming with the opposed walls of said second chamber an annular chamber, said outlet in said second chamber communicating with said annular chamber at all positions of said piston.

6. In an air pressure control member, a housing, a first chamber in said housing, a shuttle member reciprocably mounted within said first chamber, a seat for said shuttle member in said chamber, an air pressure inlet in and communicating with said chamber and positioned to direct air against said shuttle member to urge said shuttle member toward said seat, a second chamber in said housing, a piston reciprocably mounted within said second chamber, yielding means in said second chamber positioned to urge said piston against said shuttle member, an air passage in said shuttle member positioned to deliver air from said inlet to said piston to urge said piston away from said shuttle member, an air passage in said piston and communicating with said first chamber and said second chamber, said last-named air passage positioned to receive air from said shuttle member passage and to deliver said air to said second chamber when said shuttle member passage is open, and an air pressure outlet in and communicating with said second chamber, at all positions of said piston.

7. The structure of claim 6 characterized by and including a rod reciprocably mounted in said second chamber and having an end portion extending outwardly therefrom, the opposite end of said rod being positioned to engage said piston, a manually operable member pivotally mounted adjacent said housing and having a camming portion in engagement with the outer end of said rod and a detent formed in said manually operable member and positioned for reception of said rod end.

8. In a control valve, a housing, a first chamber in said housing, a second chamber in said housing in communication with said first chamber, a valve seat surrounding the juncture of said chambers, a fluid pressure inlet in said first chamber, a shuttle member slideable in said first chamber between a first position adjacent said inlet and a second position against said valve seat, a fluid pressure passage in said shuttle communicating with said inlet, a valve seat surrounding said passage, a fluid pressure outlet in said second chamber, a piston slideable in said second chamber between a sealing position against said last mentioned valve seat and an open position away from said last mentioned valve seat, said outlet communicating with said passage when said piston is in said open position and means biasing said piston into said sealing position, fluid pressure at said inlet adapted to initially move said member into said second position while said piston is in said sealing position and subsequently to move said piston into said open position to permit communication between said inlet and said outlet, an exhaust passage in said first chamber, said piston having passages therein permitting communication between said exhaust passage and said outlet passage when said shuttle member is in said first position.

References Cited in the file of this patent

UNITED STATES PATENTS

| 842,160 | Aikman | Jan. 29, 1907 |
| 850,626 | Creighton | Apr. 16, 1907 |
| 1,293,178 | Osborne | Feb. 4, 1919 |
| 2,252,418 | Shelley | Aug. 12, 1941 |
| 2,270,549 | Orr | Jan. 20, 1942 |
| 2,669,248 | Miller | Feb. 16, 1954 |
| 2,716,997 | Crookston | Sept. 6, 1955 |

FOREIGN PATENTS

| 197,913 | Germany | May 1, 1908 |
| 623,231 | France | Mar. 14, 1927 |
| 544,524 | Great Britain | Apr. 16, 1942 |